United States Patent
You et al.

(10) Patent No.: US 12,096,373 B2
(45) Date of Patent: Sep. 17, 2024

(54) METHOD AND DEVICE FOR ACTIVATING OR UPDATING PUSCH PATHLOSS RS

(71) Applicant: GUANGDONG OPPO MOBILE TELECOMMUNICATIONS CORP., LTD., Guangdong (CN)

(72) Inventors: Xin You, Guangdong (CN); Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 311 days.

(21) Appl. No.: 17/565,257

(22) Filed: Dec. 29, 2021

(65) Prior Publication Data
US 2022/0124630 A1   Apr. 21, 2022

Related U.S. Application Data

(63) Continuation of application No. PCT/CN2019/116071, filed on Nov. 6, 2019.

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/242* (2013.01); *H04W 52/325* (2013.01); *H04W 80/02* (2013.01)

(58) Field of Classification Search
CPC ... H04W 56/00; H04W 74/08; H04W 74/002; H04W 74/0841; H04W 74/0891;
(Continued)

(56) References Cited

U.S. PATENT DOCUMENTS

2011/0188428 A1   8/2011 Ishii
2019/0281588 A1*  9/2019 Zhang .................. H04B 7/0617
(Continued)

FOREIGN PATENT DOCUMENTS

WO   2018171674 A1   9/2018
WO   2019205046 A1   10/2019

OTHER PUBLICATIONS

The second Office Action of corresponding European application No. 19951791.3, dated May 23, 2023.
(Continued)

*Primary Examiner* — Nathan S Taylor
(74) *Attorney, Agent, or Firm* — Ladas & Parry LLP

(57) ABSTRACT

Embodiments of the present application relate to a method and a device for activating or updating a PUSCH-pathloss RS. The method includes: a terminal device receives a MAC CE transmitted by a network device, where the MAC CE includes at least one SRI-PUSCH-Power Control field and/or at least one pathloss RS field, the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; and the terminal device updates or activates the at least one pathloss RS corresponding to the at least one SRI-PUSCH-Power Control configuration according to the MAC CE. The method and the device for activating or updating the PUSCH-pathloss RS in the embodiments of the present application can reduce transmission delays.

15 Claims, 8 Drawing Sheets

(51) Int. Cl.
*H04W 52/32* (2009.01)
*H04W 80/02* (2009.01)

(58) Field of Classification Search
CPC ....... H04W 74/00; H04W 4/06; H04W 48/10;
H04W 48/12; H04W 48/16; H04W 88/06;
H04W 88/00; H04L 1/0071; H04L
1/0079; H04L 5/0053; H04L 69/323;
H04L 1/0027; H04L 1/0028; H04L 5/00;
H04L 1/00
See application file for complete search history.

(56) References Cited

U.S. PATENT DOCUMENTS

| | | | | |
|---|---|---|---|---|
| 2020/0119799 | A1* | 4/2020 | Jung | H04W 52/36 |
| 2021/0029650 | A1* | 1/2021 | Cirik | H04W 52/146 |
| 2022/0167279 | A1* | 5/2022 | Zhou | H04W 52/242 |
| 2022/0216929 | A1* | 7/2022 | Matsumura | H04W 52/242 |
| 2022/0232482 | A1* | 7/2022 | Matsumura | H04L 5/0048 |
| 2022/0248336 | A1* | 8/2022 | Matsumura | H04W 52/242 |
| 2022/0271890 | A1* | 8/2022 | Grossmann | H04L 5/0051 |
| 2022/0295418 | A1* | 9/2022 | Okamura | H04W 52/325 |
| 2022/0312338 | A1* | 9/2022 | Matsumura | H04W 24/08 |
| 2022/0330173 | A1* | 10/2022 | Matsumura | H04L 5/0051 |
| 2022/0369242 | A1* | 11/2022 | Matsumura | H04W 52/42 |
| 2023/0024375 | A1* | 1/2023 | Yao | H04W 52/242 |
| 2024/0107460 | A1* | 3/2024 | Yao | H04W 52/146 |
| 2024/0121851 | A1* | 4/2024 | Matsumura | H04W 76/20 |

OTHER PUBLICATIONS

The search report of the parallel EP application No. 19951791.3 dated on Jun. 17, 2022.

Anonymous:"3rd Generation Partnership Project; Technical Specification Group Radio Access Network;NR;Radio Resource Control (RRC) protocol specification (Release 15)",3GPP TS 38.331 V15.7.0 (Sep. 2019).
Ericsson:"Signalling reduction for beam-based UL power control", Tdoc R1-1907475, 3GPP TSG-RAN WG1 Meeting #97, Reno, USA, May 13-May 17, 2019.
Apple Inc.: "Remaining Issues on Multi-beam operation", R1-191096, 3GPP TSG-RAN WG1 Meeting #98bis, Chongqing, China, Oct. 14-20, 2019.
Anonymous:"3rd Generation Partnership Project, Technical Specification Group Radio Access Network;NR,Medium Access Control (MAC) protocol specification(Release 15)",3GPP TS 38.321 V15.7.0 (Sep. 2019).
First Office Action of corresponding European application No. 19951791.3, dated Feb. 7, 2023.
International Search Report (ISR) dated Jul. 29, 2020 for Application No. PCT/CN2019/116071.
OPPO:"Discussion on Multi-beam Operation Enhancements" R1-1910117. Oct. 4, 2019.
China Telecom:"Enhancements on multi-beam operation" R1-1911236, Oct. 4, 2019.
Ericsson:"Enhancements to multi-beam operation", R1-1907436, May 3, 2019.
CATT: Remaining issues on beam management enhancements in Rel.16° R1-1910350, Oct. 5, 2019.
Fraunhofer IIS, Fraunhofer HH:"Enhancements on UE multi-beam operation" R1-1910432, Oct. 4, 2019.
ZTE:"Enhancements on multi-beam operation" R1-1910285, Oct. 5, 2019.
3GPP TS 38.321 V15.4.0; 3rd Generation Partnership Project; Technical Specification Group Radio Access Network; NR; Medium Access Control (MAC) protocol specification (Release 15).
3GPP TS 38.331 V15.5.1;3rd Generation Partnership Project; Technical Specification Group Radio Access Network; NR: Radio Resource Control (RRC) protocol specification (Release 15).

* cited by examiner

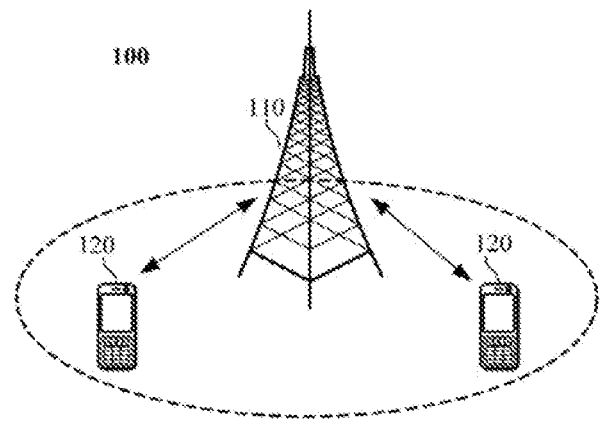
FIG. 1
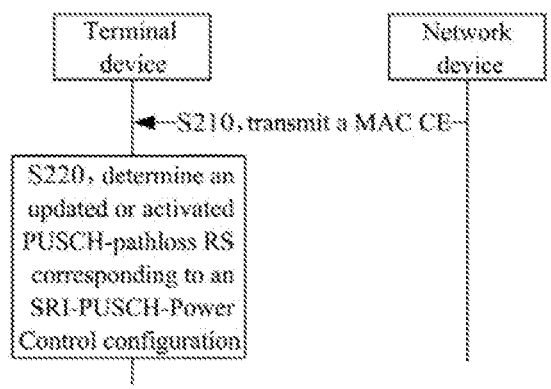
FIG. 2
FIG. 3

| R | Serving cell ID | BWP ID | Oct 1 |
| SRI-PUSCH-Power Control ID | | PUSCH-pathloss RS ID | Oct 2 |

FIG. 4

| R | | Serving cell ID | BWP ID | Oct 1 |
| R | R | SRI-PUSCH-Power Control ID | PUSCH-pathloss RS ID | Oct 2 |
| ... | | | | |
| R | R | SRI-PUSCH-Power Control ID | PUSCH-pathloss RS ID | Oct N |

FIG. 5

| R | Serving cell ID | BWP ID | Oct 1 |
| SRI-PUSCH-Power Control ID | PUSCH-pathloss RS ID | | Oct 2 |
| ... | | | |
| SRI-PUSCH-Power Control ID | PUSCH-pathloss RS ID | | Oct N |

| R | Serving cell ID | | BWP ID | Oct 1 |
|---|---|---|---|---|
| $S_0$ | PUSCH-pathloss RS ID | $S_1$ | PUSCH-pathloss RS ID | Oct 2 |
| $S_2$ | PUSCH-pathloss RS ID | $S_3$ | PUSCH-pathloss RS ID | Oct 3 |
| ... | | | | |
| $S_{14}$ | PUSCH-pathloss RS ID | $S_{15}$ | PUSCH-pathloss RS ID | Oct N |

FIG. 9

| R | Serving cell ID | | | | | | BWP ID | Oct 1 |
|---|---|---|---|---|---|---|---|---|
| $S_7$ | $S_6$ | $S_5$ | $S_4$ | $S_3$ | $S_2$ | $S_1$ | $S_0$ | Oct 2 |
| $S_{15}$ | $S_{14}$ | $S_{13}$ | $S_{12}$ | $S_{11}$ | $S_{10}$ | $S_9$ | $S_8$ | Oct 3 |
| ... | | | | | | | | |
| SRI-PUSCH-Power Control ID | | | | SRI-PUSCH-Power Control ID | | | | Oct N |

FIG. 10

| R | Serving cell ID | BWP ID | Oct 1 |
|---|---|---|---|
| $S_7$ | $S_6$ | $S_5$ | $S_4$ | $S_3$ | $S_2$ | $S_1$ | $S_0$ | Oct 2 |

...

| SRI-PUSCH-Power Control ID | SRI-PUSCH-Power Control ID | Oct N |

FIG. 11

| R | Serving cell ID | BWP ID | Oct 1 |
| R | R | R | R | SRI-PUSCH-Power Control ID | Oct 2 |
| $S_7$ | $S_6$ | $S_5$ | $S_4$ | $S_3$ | $S_2$ | $S_1$ | $S_0$ | Oct 3 |

...

| R | R | R | R | SRI-PUSCH-Power Control ID | Oct N-1 |
| $S_7$ | $S_6$ | $S_5$ | $S_4$ | $S_3$ | $S_2$ | $S_1$ | $S_0$ | Oct N |

FIG. 12

| R | Serving cell ID | BWP ID | Oct 1 |
|---|---|---|---|
| PUSCH-pathloss RS ID | | PUSCH-pathloss RS ID | Oct 2 |
| PUSCH-pathloss RS ID | | PUSCH-pathloss RS ID | Oct 3 |
| ... | | | |
| PUSCH-pathloss RS ID | | PUSCH-pathloss RS ID | Oct N |

FIG. 13

| R | Serving cell ID | BWP ID | Oct 1 |
|---|---|---|---|
| SRI-PUSCH-Power Control ID | | SRI-PUSCH-Power Control ID | Oct 2 |
| SRI-PUSCH-Power Control ID | | SRI-PUSCH-Power Control ID | Oct 3 |
| ... | | | |
| SRI-PUSCH-Power Control ID | | SRI-PUSCH-Power Control ID | Oct N |

FIG. 14

METHOD AND DEVICE FOR ACTIVATING OR UPDATING PUSCH PATHLOSS RS

CROSS-REFERENCE TO RELATED APPLICATION

This application is a continuation of International Application No. PCT/CN2019/116071 filed on Nov. 6, 2019, which is hereby incorporated by reference in its entirety.

TECHNICAL FIELD

The present application relates to the field of communications and, in particular, to a method and a device for activating or updating a PUSCH-pathloss RS.

BACKGROUND

A network device can configure an identifier (ID) of each space relationship information (SRI) physical uplink shared channel (PUSCH)-Power Control configuration and an ID of a corresponding PUSCH-pathloss reference signal (RS) through a radio resource control (RRC) message for a terminal device. At the same time, the network device can also activate or update one or more PUSCH-pathloss RSs through the RRC message.

However, a transmission delay of the RRC message is relatively large, and how to activate or update the PUSCH-pathloss RS more quickly is a problem to be solved urgently at present.

SUMMARY

Embodiments of the present application provide a method and a device for activating or updating a PUSCH-pathloss RS, which can reduce transmission delays.

In a first aspect, a method for activating or updating a PUSCH-pathloss RS is provided, including: receiving, by a terminal device, a MAC CE transmitted by a network device, where the MAC CE includes at least one SRI-PUSCH-Power Control field and/or at least one pathloss RS field, and the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; and updating or activating, by the terminal device, the at least one pathloss RS corresponding to the at least one SRI-PUSCH-Power Control configuration according to the MAC CE.

In a second aspect, a method for activating or updating a PUSCH-pathloss RS is provided, including: transmitting, by a network device, a MAC CE to a terminal device, where the MAC CE includes at least one SRI-PUSCH-Power Control field and/or at least one pathloss RS field, the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; the MAC CE is used to indicate updating or activation of the at least one pathloss RS corresponding to the at least one SRI-PUSCH-Power Control configuration by the terminal device.

In a third aspect, a terminal device is provided, which is configured to execute the method in the above-mentioned first aspect or each of its implementation. Specifically, the terminal device includes a functional module for executing the method in the above-mentioned first aspect or each of its implementation.

In a fourth aspect, a network device is provided, which is configured to execute the method in the above-mentioned second aspect or each of its implementation. Specifically, the network device includes a functional module for executing the method in the above-mentioned second aspect or each of its implementation.

In a fifth aspect, a terminal device is provided, including a processor and a memory. The memory is configured to store a computer program, and the processor is configured to call and run the computer program stored in the memory to execute the method in the above-mentioned first aspect or each of its implementation.

In a sixth aspect, a network device is provided, including a processor and a memory. The memory is configured to store a computer program, and the processor is configured to call and run the computer program stored in the memory, and execute the method in the above-mentioned second aspect or each of its implementation.

In a seventh aspect, a chip is provided for implementing the method in any one of the above-mentioned first aspect to the second aspect or each of its implementation. Specifically, the chip includes: a processor, configured to call and run a computer program from the memory, so that a device installed with the chip executes the method in any one of the above-mentioned first aspect to the second aspect or each of its implementation.

In an eighth aspect, a computer-readable storage medium is provided for storing a computer program that causes a computer to execute the method in any one of the first aspect to the second aspect or each of its implementation.

In a ninth aspect, a computer program product is provided, including computer program instructions that cause a computer to execute the method in any one of the above-mentioned first aspect to the second aspect or each of its implementation.

In a tenth aspect, a computer program is provided, which when running on a computer, causes a computer to execute the method in any one of the above-mentioned first aspect to second aspect or each of its implementation.

Through the above technical solutions, a PUSCH-pathloss RS ID corresponding to an SRI-PUSCH-Power Control configuration is activated or updated based on the MAC CE, so that the transmission delay is greatly reduced.

BRIEF DESCRIPTION OF DRAWINGS

FIG. 1 is a schematic diagram of a communication system architecture according to an embodiment of the present application.

FIG. 2 is a schematic diagram of a method for activating or updating a PUSCH-pathloss RS according to an embodiment of the present application.

FIG. 3 is a schematic diagram of a MAC CE format according to an embodiment of the present application.

FIG. 4 is a schematic diagram of another MAC CE format according to an embodiment of the present application.

FIG. 5 is a schematic diagram of another MAC CE format according to an embodiment of the present application.

FIG. 6 is a schematic diagram of another MAC CE format according to an embodiment of the present application.

Figures 7, 8:
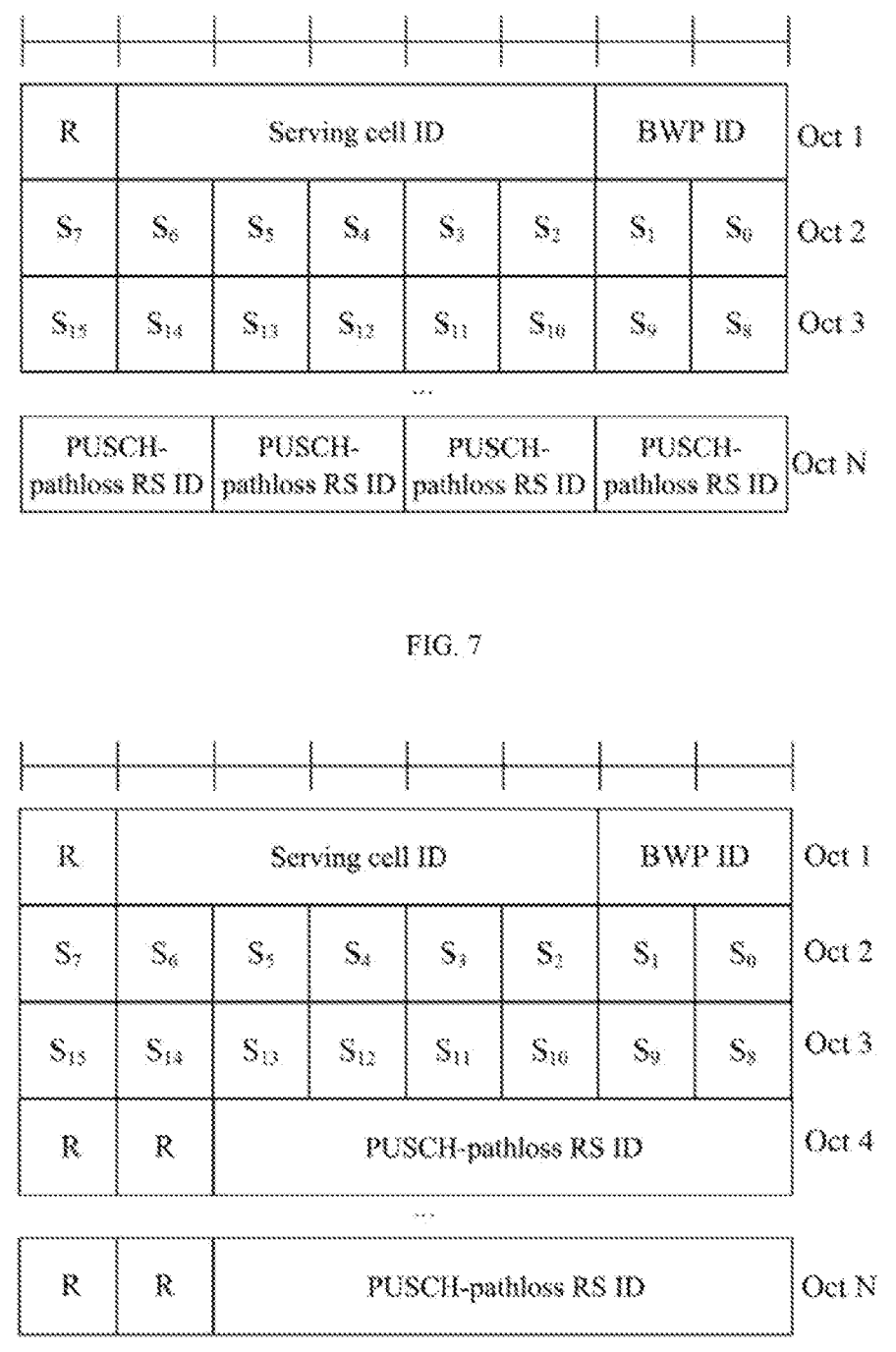

FIG. 7 is a schematic diagram of another MAC CE format according to an embodiment of the present application.

FIG. 8 is a schematic diagram of another MAC CE format according to an embodiment of the present application.

FIG. 9 is a schematic diagram of another MAC CE format according to an embodiment of the present application.

FIG. 10 is a schematic diagram of another MAC CE format according to an embodiment of the present application.

FIG. 11 is a schematic diagram of another MAC CE format according to an embodiment of the present application.

FIG. 12 is a schematic diagram of another MAC CE format according to an embodiment of the present application.

FIG. 13 is a schematic diagram of another MAC CE format according to an embodiment of the present application.

FIG. 14 is a schematic diagram of another MAC CE format according to an embodiment of the present application.

DESCRIPTION OF EMBODIMENTS

Figure 15:
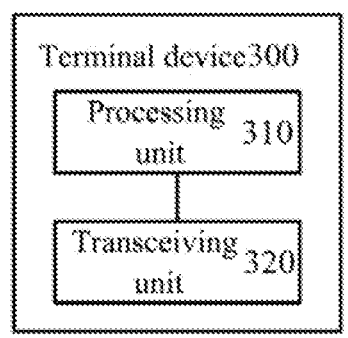
FIG. 15 is a schematic block diagram of a terminal device according to an embodiment of the present application.

The following describes technical solutions in embodiments of the present application in conjunction with the accompanying drawings in the embodiments of the present application. Obviously, the described embodiments are part of the embodiments of the present application, not all of the embodiments. All other embodiments obtained by those of ordinary skill in the art without paying creative work are within the protection scope of the present application based on the embodiments of the present application.

The technical solutions of the embodiments of the present application can be applied to various communication systems, such as: a global system of mobile communication (GSM) system, a code division multiple access (CDMA) system, and a wideband code division multiple access (WCDMA) system, a general packet radio service (GPRS), a long term evolution (LTE) system, an LTE frequency division duplex (FDD) system, an LTE time division duplex (TDD) system, an universal mobile telecommunication system (UMTS), a worldwide interoperability for microwave access (WiMAX) communication system or a 5G system, etc.

Exemplarily, a communication system 100 applied in an embodiment of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices located in the coverage area. In an embodiment, the network device 110 may be a base station (Base Transceiver Station, BTS) in a GSM system or a CDMA system, may also be a base station (NodeB, NB) in a WCDMA system, or an evolved base station (Evolutional Node B, eNB or eNodeB) in an LTE system, or a wireless controller in a cloud radio access network (CRAN), or the network device can be a mobile switching center, a relay station, an access point, a vehicle-mounted device, a wearable device, a hub, a switch, a bridge, a router, a network side device in a 5G network, or a network device in a facture evolution of a public land mobile network (PLMN), etc.

The communication system 100 also includes at least one terminal device 120 located within the coverage area of the network device 110. As used herein, "a terminal device" includes, but is not limited to, a device connected via a wired line, such as a device connected via a public switched telephone network (PSTN), a digital subscriber line (DSL), a digital cable, and a direct cable; and/or another data connection/network; and/or via a wireless interface, such as for a cellular network, a wireless local area network (WLAN), a digital TV network such as a DVB-H network, a satellite network, an AM-FM broadcast transmitter; and/or an apparatus of another terminal device that is set to receive/transmit communication signals; and/or an internet of things (IoT) device. A terminal device set to communicate through a wireless interface may be referred to as a "wireless communication terminal", a "wireless terminal" or a "mobile terminal". Examples of mobile terminals include, but are not limited to, satellites or cellular phones; personal communications system (PCS) terminals that can combine cellular radio phones with data processing, fax, and data communication capabilities; can include radio phones, pagers, internet/intranet access, Web browser, memo pad, calendar, and/or a PDA of a global positioning system (GPS) receiver; and a conventional laptop and/or a palmtop receiver or other electronic devices including radio telephone transceivers. The terminal device can refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. An access terminal can be a cellular phone, a cordless phone, a session initiation protocol (SIP) phone, a wireless local loop (WLL) station, a personal digital assistant (PDA), and a functional handheld device with wireless communication functions, a computing device or other processing devices connected to wireless modems, a vehicle-mounted device, a wearable device, a terminal device in a 5G network, or a terminal device in a future evolution of PLMN, etc.

In an embodiment, device to device (D2D) communication can be performed between the terminal devices 120.

In an embodiment, the 5G system or the 5G network may also be referred to as a new radio (NR) system or a NR network.

FIG. 1 exemplarily shows one network device and two terminal devices. In an embodiment, the communication system 100 may include multiple network devices and a coverage of each network device may include other numbers of terminal devices, which is not limited in the embodiments of the present application.

In an embodiment, the communication system 100 may also include other network entities such as a network controller and a mobility management entity, which are not limited in the embodiments of the present application.

It should be understood that a device with a communication function in the network/system in the embodiment of the present application may be referred to as a communication device. Taking the communication system 100 shown in FIG. 1 as an example, the communication device may include a network device 110 with a communication function and a terminal device 120. The network device 110 and the terminal device 120 may be the specific devices described above, which will not be repeated here. The communication device may also include other devices in the communication system 100, such as network controllers, mobility management entities, and other network entities, which are not limited in the embodiments of the application.

It should be understood that terms "system" and "network" are often used interchangeably herein. The term "and/or" herein is only an association relationship describing associated objects, which means that there can be three kinds of relationships, for example, A and/or B, which represents three situations: A exists alone, A and B exist at the same time, B exists alone. In addition, the character "/" herein generally indicates that the associated objects before and after are in an "or" relationship.

Considering that a time delay for activating or updating a PUSCH-pathloss RS through an RRC message is relatively long, therefore, the embodiments of the present application provide a method for activating or updating a pathloss RS of a physical uplink shared channel PUSCH, where indications can be implemented through a medium access control (MAC) control element (CE).

Specifically, FIG. 2 is a schematic flowchart of a method 200 for activating or updating a pathloss RS of a physical uplink shared channel PUSCH according to an embodiment of the present application. As shown in FIG. 2, the method 200 includes: S210, transmitting a MAC CE, that is, a network device transmits a MAC CE to a terminal device. Where the MAC CE includes at least one SRI-PUSCH-Power Control field and/or at least one PUSCH-pathloss RS field, the at least one SRI-PUSCH-Power Control field is used to indicate at least one SRI-PUSCH-Power Control configuration, and the at least one PUSCH-pathloss RS field is used to indicate at least one PUSCH pathloss RS corresponding to the at least one SRI-PUSCH-Power Control configuration.

It should be understood that a type of the above-mentioned MAC CE can be distinguished by a logical channel identifier (LCID). For example, a header of a MAC subPDU or a header of a MAC protocol data unit (PDU) where the MAC CE is located includes an LCID field, and the LCID field is used to indicate a type of the MAC CE. In addition, a value of an LCID used to indicate a type of the MAC CE in the embodiments of the present application can be set according to actual applications. For example, any value between 33 and 46 can be selected, but the embodiments of the present application are not limited thereto.

In an embodiment, the MAC CE may further include a serving cell identifier field, where the serving cell identifier field is used to indicate an ID of a serving cell where the terminal device resides. A size of the serving cell identifier field can be set according to the maximum number of serving cells. For example, if the maximum number of serving cells is 32, then the corresponding serving cell identifier field occupies 5 bits.

In an embodiment, the MAC CE further includes a bandwidth part (BWP) identifier field, where the bandwidth part identifier field is used to indicate a BWP ED corresponding to the terminal device. A size of the bandwidth part identifier field can be set according to the maximum number of bandwidth parts. For example, if the maximum number of the bandwidth part is 4, then the corresponding bandwidth part identifier field occupies 2 bits.

In an embodiment, the MAC CE may also include a reserved bit represented as "R", however, the embodiments of the present application are not limited thereto.

It should be understood that the method 200 in the embodiment of the present application may be executed by a terminal device and a network device. For example, the terminal device may be the terminal device shown in FIG. 1, and the network device may be the network device shown in FIG. 1, but the embodiments of the present application are not limited thereto.

As shown in FIG. 2, the method 200 further includes: S220, determining an updated or activated PUSCH-pathloss RS corresponding to an SRI-PUSCH-Power Control configuration. The terminal device receives the MAC CE transmitted by the network device, and updates or activates, according to the MAC CE, the at least one PUSCH-pathloss RS corresponding to the at least one SRI-PUSCH-Power Control configuration indicated by the MAC CE.

The network device can configure one or more SRI-PUSCH-Power Control configurations for the terminal device, and can also configure one or more PUSCH-pathloss RSs, and there is a corresponding relationship between the SRI-PUSCH-Power Control configuration and the PUSCH-pathloss RS. Far example, the maximum number of the SRI-PUSCH-Power Control configurations is usually 16, and the maximum number of the PUSCH-pathloss RSs is usually 8 or 16, or it can also be 32 or 64 in addition, one SRI-PUSCH-Power Control configuration usually corresponds to one PUSCH-pathloss RS, but there may be multiple SRI-PUSCH-Power Control configurations corresponding to the same PUSCH-pathloss RS, that is, one PUSCH-pathloss RS may correspond to one or more SRI-PUSCH-Power Control configuration, but the embodiments of the present application are not limited thereto.

In an embodiment, the network device may configure the one or more SRI-PUSCH-Power Control configurations and/or configure one or more PUSCH-pathloss RSs for the terminal device through an RRC message, or the network device may also configure a corresponding relationship between the SRI-PUSCH-Power Control configuration and the PUSCH-pathloss RS for the terminal device through an RRC message, but the embodiments of the present application are not limited thereto.

It should be understood that there may exist multiple forms for the MAC CE of the embodiments of the present application. For example, at least one SRI-PUSCH-Power Control field and/or at least one PUSCH-pathloss RS field included in the MAC CE may be set in different ways. In the following, various situations will be described in detail with reference to FIG. 3 to FIG. 14 which show several different MAC CE formats respectively.

In an embodiment, as a first embodiment, the MAC CE may include at least one SRI-PUSCH-Power Control field and at least one PUSCH-pathloss RS field, and the at least one SRI-PUSCH-Power Control field corresponds to the at least one PUSCH-pathloss RS field one by one, that is, one SRI-PUSCH-Power Control field corresponds to one PUSCH-pathloss RS field, and one SRI-PUSCH-Power Control field in the at least one SRI-PUSCH-Power Control field is used to indicate an identifier (ID) (or can also be referred to as an SRI-PUSCH-Power Control ID) of one SRI-PUSCH-Power Control configuration in the at least one SRI-PUSCH-Power Control configuration, one PUSCH-pathloss RS field in the at least one PUSCH-pathloss RS field is used to indicate an ID of one PUSCH-pathloss RS in the at least one PUSCH-pathloss RS.

In an embodiment, since multiple SRI-PUSCH-Power Control configurations may correspond to the same PUSCH-pathloss RS, therefore, in the first embodiment, at least one PUSCH-pathloss RS field in the MAC CE may include multiple PUSCH-pathloss RS fields which include an ID of the same PUSCH-pathloss RS.

It should be understood that since the SKI-PUSCH-Power Control field is used to indicate an ID of the SRI-PUSCH-Power Control configuration, and the PUSCH-pathloss RS field is used to indicate an ID of the PUSCH-pathloss RS, the size of each SRI-PUSCH-Power Control field is related to the number of SRI-PUSCH-Power Control configurations, and the size of each PUSCH-pathloss RS field is related to the number of PUSCH-pathloss RSs.

In an embodiment, the method 200 may further include: the terminal device determines the size of each SRI-PUSCH-Power Control field in the at least one SRI, PUSCH-Power Control field according to the number of the at least one SRI-PUSCH-Power Control configuration. For example, as shown in FIG. 3 to FIG. 6, it is assumed that the maximum number of the at least one SRI-PUSCH-Power Control configuration is 16, then each SRI-PUSCH-Power Control field occupies 4 bits.

Similarly, the method 200 may further include: the terminal device determines the size of each PUSCH-pathloss RS field in the at least one PUSCH pathloss RS field according to the number of the at least one PUSCH-pathloss RS field. For example, as shown in FIG. 3 and FIG. 5, it is assumed that the maximum number of the at least one PUSCH-pathloss RS is 4, then each PUSCH-pathloss RS field occupies 2 bits; for another example, it is assumed that the maximum number of the at least one PUSCH-pathloss RS is 8, then each PUSCH-pathloss RS field occupies 3 bits; for another example, as shown in FIGS. 4 and FIG. 6, it is assumed that the maximum number of the at least one PUSCH-pathloss RS is 16, then each PUSCH-pathloss RS field occupies 4 bits, and so on.

In the first embodiment, one SRI-PUSCH-Power Control field corresponds to one PUSCH-pathloss RS field, so for any one of MAC CEs, said MAC CE can be used to indicate a PUSCH-pathloss RS corresponding to one or more SRI-PUSCH-Power Control configurations. For example, as shown in FIG. 3 and FIG. 4, a MAC CE can only be used to indicate one PUSCH-pathloss RS corresponding to one SRI-PUSCH-Power Control configuration, then the MAC CE includes an SRI-PUSCH-Power Control field and a PUSCH-pathloss RS field, the SRI-PUSCH-Power Control field includes an ID of the SRI-PUSCH-Power Control configuration, and the PUSCH-pathloss RS field includes an ID of the PUSCH-pathloss RS corresponding to the SRI-PUSCH-Power Control configuration, then the terminal device determines, according to the MAC CE, the PUSCH-pathloss RS corresponding to an SRI-PUSCH-Power Control configuration that needs to be activated or updated. If it is necessary to activate or update PUSCH-pathloss RSs corresponding to multiple SRI-PUSCH-Power Control configurations, multiple MAC CEs can be transmitted to the terminal device.

For another example, as shown in FIG. 5 and FIG. 6, a MAC CE can also be used to indicate PUSCH-pathloss RSs corresponding to multiple SRI-PUSCH-Power Control configurations, then the MAC CE includes multiple SRI-PUSCH-Power Control fields and multiple PUSCH-pathloss RS fields, where an SRI-PUSCH-Power Control field includes an ID of an SRI-PUSCH-Power Control configuration, and a corresponding PUSCH-pathloss RS field includes an ID of a PUSCH-pathloss RS corresponding to the SRI-PUSCH-Power Control configuration. It is assumed that the MAC CE includes N octets (Oct) as shown in FIG. 5 and FIG. 6, then the MAC CE can be used to indicate at least N-1 SRI-PUSCH-Power Control configurations and their corresponding PUSCH-pathloss RSs, so that the terminal device can update or activate the PUSCH-pathloss RSs corresponding to the N-1 SRI-PUSCH-Power Control configurations according to the MAC CE.

In an embodiment, as a second embodiment, take the MAC CE including at least one SRI-PUSCH-Power Control field and at least one PUSCH-pathloss RS field as an example, but different from the first embodiment, this MAC CE specifically includes multiple SRI-PUSCH-Power Control fields, and the multiple SRI-PUSCH-Power Control fields correspond to multiple SRI-PUSCH-Power Control configurations configured for the terminal device one by one. Each SRI-PUSCH-Power Control field in the multiple SRI-PUSCH-Power Control fields is used to indicate whether a PUSCH-pathloss RS of a corresponding SRI-PUSCH-Power Control configuration needs to be updated or activated, that is, each SRI-PUSCH-Power Control field is not the ID of the SRI-PUSCH-Power Control configuration in the first embodiment.

In addition, an SRI-PUSCH-Power Control field represented as a first value in the multiple SRI-PUSCH-Power Control fields is the at least one SRI-PUSCH-Power Control field, that is, if a certain SRI-PUSCH-Power Control field in the multiple SRI-PUSCH-Power Control fields is a first value, then said SRI-PUSCH-Power Control field belongs to the at least one SRI-PUSCH-Power Control field in the aforementioned S210, that is, a PUSCH-pathloss RS of an SRI-PUSCH-Power Control configuration corresponding to said SRI-PUSCH-Power Control field needs to be updated or activated; on the contrary, if a certain SRI-PUSCH-Power Control field in the multiple SRI-PUSCH-Power Control fields is not the first value, then this SRI-PUSCH-Power Control field does not belong to the at least one SRI-PUSCH-Power Control field in the aforementioned S210, that is, a PUSCH-pathloss RS of an SRI-PUSCH-Power Control configuration corresponding to this SRI-PUSCH-Power Control field does not need to be updated or activated.

The network device can configure multiple SRI-PUSCH-Power Control configurations for the terminal device, and multiple SRI-PUSCH-Power Control fields which correspond to the multiple SRI-PUSCH-Power Control configurations one by one can be set. Some or all of the multiple SRI-PUSCH-Power Control fields belong to the at least one SRI-PUSCH-Power Control field in the aforementioned S210, then in the MAC CE, the at least one PUSCH-pathloss RS field is set corresponding to the at least one SRI-PUSCH-Power Control field one by one, where a PUSCH-pathloss RS field in the at least one PUSCH-pathloss RS field is used to indicate an ID of a PUSCH-pathloss RS in the at least one PUSCH-pathloss RS.

It should be understood that since the PUSCH-pathloss RS field is used to indicate an ID of the PUSCH-pathloss RS, the size of each PUSCH-pathloss RS field is thus related to the number of PUSCH-pathloss RSs. In an embodiment, the method 200 may further include; the terminal device determines the site of each PUSCH pathloss RS field in the at least one PUSCH-pathloss RS field according to the number of the at least one PUSCH-pathloss RS field. For example, as shown in FIG. 7, it is assumed that the maximum number of the at least one PUSCH-pathloss RS is 4, then each PUSCH-pathloss RS field occupies 2 bits; for another example, as shown in FIG. 8, it is assumed that the maximum number of the at least one PUSCH-pathloss RS is 64, then each PUSCH-pathless RS field occupies 6 bits; for another example, as shown in FIG. 9, it is assumed that the maximum number of at least one PUSCH-pathloss RS is 8, then each PUSCH-pathloss RS field occupies 3 bits, and so on.

In addition, each SRI-PUSCH-Power Control field in the multiple SRI-PUSCH-Power Control fields is used to indicate whether the PUSCH-pathloss RS of the corresponding SRI-PUSCH-Power Control configuration needs to be updated or activated. Therefore, each SRI-PUSCH-Power Control field can be set to occupy simply 1 bit. For example, if a certain SRI-PUSCH-Power Control field is "1", it means that the SRI-PUSCH-Power Control field is a first value, that is, the PUSCH-pathloss RS of the SRI-PUSCH-Power Control configuration corresponding to this SRI-PUSCH-Power Control field needs to be updated or activated, and a PUSCH-pathloss RS field corresponding to this SRI-PUSCH-Power Control field is set in the MAC CE, so as to indicate an ID of the updated or activated PUSCH-pathloss RS; on the contrary, if a certain SRI-PUSCH-Power Control field is "0", it means that the SRI-PUSCH-Power Control field is not a first value, that is, the PUSCH-pathloss RS of the SRI-PUSCH-Power Control configuration corresponding to the SRI-PUSCH-Power Control field does not need to be updated or activated. In an embodiment, each SRI-PUSCH-Power Control field in the multiple SRI-PUSCH-Power Control fields may also be set to occupy multiple bits, and the embodiments of the present application are not limited thereto.

The multiple SRI-PUSCH-Power Control fields in the MAC CE in the second embodiment may be contiguous or non-contiguous. Specifically, as a first case, the multiple SRI-PUSCH-Power Control fields may be contiguous. For example, the MAC CE may include an SRI-PUSCH-Power Control bitmap. The aforementioned multiple SRI-PUSCH-Power Control fields in the second embodiment are consecutive multiple bits included in the SRI-PUSCH-Power Control bitmap.

For example, as shown in FIG. 7 and FIG. 8, it is assumed that the terminal device has a maximum of 16 SRI-PUSCH-Power Control configurations, then an SRI-PUSCH-Power Control bitmap included in the MAC CE can be set to 16 bits, i.e., S0 to S15 in Oct2 and Oct3 shown in FIG. 7 and FIG. 8, each bit represents an SRI-PUSCH-Power Control field correspondingly, and the MAC CE includes a total of 16 SRI-PUSCH-Power Control fields. Where the arrangement of these 16 SRI-PUSCH-Power Control fields may be as shown in FIG. 7 or FIG. 8, or other arrangements may also be used, and the embodiments of the present application are not limited thereto.

For at least one SRI-PUSCH-Power Control field whose bit value is "1" in a bitmap formed by the 16 SRI-PUSCH-Power Control fields, at least One PUSCH-pathloss RS field is correspondingly set thereafter one by one each PUSCH-pathloss RS field includes an ID of a PUSCH-pathloss RS, so as to indicate that the terminal device updates or activates the PUSCH-pathloss RS. For example, it is assumed that a value of $S_3$ is "1", then a PUSCH-pathloss RS field is set corresponding to the $S_3$. The PUSCH-pathloss RS field includes an ID of a PUSCH-pathloss RS, the ID of the PUSCH-pathloss RS of the SRI-PUSCH-Power Control configuration corresponding to the $S_3$ is updated or activated by the terminal device.

On the contrary, for other SRI-PUSCH-Power Control fields whose bit values are "0" in the bitmap formed by the 16 SRI-PUSCH-Power Control fields, the PUSCH-pathloss RS field may not be set, or, the PUSCH-pathloss RS field may also be set, but the terminal device does not need to activate or update an ID of an PUSCH-pathloss RS carried therein.

It should be understood that in the first case, if for the PUSCH-pathloss RS which does not need to be activated or updated by the terminal device, the PUSCH-pathloss RS field is not set, that is, a value of a certain bit in the SRI-PUSCH-Power Control bitmap is not a first value, a PUSCH-pathloss RS field corresponding thereto is not set, then the size of the MAC CE depends on the number of PUSCH-pathloss RSs, of the SRI-PUSCH-Power Control configurations, that need to be updated or activated by the terminal device.

In an embodiment, as another case, the multiple SRI-PUSCH-Power Control fields may also be non-contiguous. For example, the MAC CE includes multiple SRI-PUSCH-Power Control fields, in addition, it also includes multiple PUSCH-pathloss RS fields, the multiple PUSCH-pathloss RS fields correspond to the multiple SRI-PUSCH-Power Control fields one by one. For example, a first PUSCH-pathloss RS field in the multiple PUSCH-pathloss RS fields corresponds to a first SRI-PUSCH-Power Control field in the multiple SRI-PUSCH-Power Control fields, the first PUSCH-pathloss RS field and the first SRI-PUSCH-Power Control field are contiguous, where the first SRI-PUSCH-Power Control field is any one of the multiple SRI-PUSCH-Power Control fields, and the first PUSCH-pathloss RS field is a field in the multiple PUSCH-pathloss RS fields corresponding to the first SRI-PUSCH-Power Control field.

The first SRI-PUSCH-Power Control field is used to indicate whether the first PUSCH-pathloss RS of the corresponding first SRI-PUSCH-Power Control configuration needs to be activated or updated by the terminal device, and the first PUSCH-pathloss RS field is used to indicate an ID of the first PUSCH-pathloss RS, that is, the first PUSCH-pathloss RS corresponds to the first SRI-PUSCH-Power Control configuration corresponding to the first SRI-PUSCH-Power Control field.

In this case, the size of the MAC CE depends on the number of SRI-PUSCH-Power Control configurations configured by the network device for the terminal device. If the number of SRI-PUSCH-Power Control configurations is fixed, then the size of the MAC CE is fixed.

For example, as shown in FIG. 9, it is assumed that the terminal device has a maximum of 16 SRI-PUSCH-Power Control configurations, then the MAC CE can be set with 16 SRI-PUSCH-Power Control fields, which are represented as $S_0$ to $S_{15}$ in FIG. 9 respectively, each SRI-PUSCH-Power Control field corresponds to a PUSCH-pathless RS field, that is, the MAC CE has 16 PUSCH-pathloss RS fields. If a certain SRI-PUSCH-Power Control field in the 16 SRI-PUSCH-Power Control fields is "1", for example, if $S_1$ is "1" the terminal device obtains an ID of a PUSCH-pathloss RS in a PUSCH-pathloss RS field after the $S_1$, and the PUSCH-pathloss RS indicated by this ID is the PUSCH-pathloss RS of the SRI-PUSCH-Power Control configuration corresponding to the $S_1$ which needs to be activated or updated by the terminal device. On the contrary, if a certain SRI-PUSCH-Power Control field is not "1", for example, if $S_2$ is "0", it means that the PUSCH-pathloss RS of the SRI-PUSCH-Power Control configuration corresponding to the $S_2$ does not need to be updated or activated.

In an embodiment, as a third embodiment, an example is taken where the MAC CE includes at least one SRI-PUSCH-Power Control field and at least one PUSCH-pathloss RS field, however, different from the previous two embodiments, it is assumed here that among multiple SRI-PUSCH- Power Control configurations configured by the network device for the terminal device, the situation where multiple SRI-PUSCH-Power Control configurations corresponding to the same PUSCH-pathless RS no longer exists, that is, one PUSCH-pathloss RS has at most one SRI-PUSCH-Power Control configuration corresponds thereto, for example, multiple SRI-PUSCH-Power Control configurations can correspond to multiple PUSCH-pathloss RSs one by one, then refer to the second embodiment for the setting, of multiple SRI-PUSCH-Power Control fields, multiple PUSCH-pathloss RS fields can also be set. For example, in the second embodiment, the SRI-PUSCH-Power Control fields can be a bitmap. Then, in the third embodiment, the PUSCH-pathloss RS fields can also be set as a bitmap.

Specifically, the MAC CE may include multiple PUSCH-pathloss RS fields, and the multiple PUSCH-pathloss RS fields correspond to multiple PUSCH-pathloss RSs configured by the network device for the terminal device one by one, and each PUSCH-pathloss RS field is used to indicate Whether the corresponding PUSCH-pathless RS needs to be updated or activated. For example, the multiple PUSCH-pathloss RS fields may be a PUSCH-pathloss RS bitmap, and multiple bits included in the PUSCH-pathloss RS bitmap correspond to the multiple PUSCH-pathloss RSs configured by the network device for the terminal device one by one. Each bit in the PUSCH-pathloss RS bitmap is used to indicate whether the corresponding PUSCH-pathloss RS needs to be updated or activated. That is, if a certain PUSCH-pathloss RS field in the multiple PUSCH-pathloss RS fields is a first value, then the PUSCH-pathloss RS field belongs to the at least one PUSCH-pathloss RS field in the aforementioned S210, that is, a PUSCH-pathloss RS of an SRI-PUSCH-Power Control configuration corresponding to this PUSCH-pathloss RS field needs to be updated or activated; on the contrary, if a certain PUSCH-pathloss RS field in the multiple PUSCH-pathloss RS fields is not the first value, then this PUSCH-pathloss RS field does not belong to the at least one PUSCH-pathloss RS field in the aforementioned S210, that is, a PUSCH-pathloss RS of an SRI-PUSCH-Power Control configuration Corresponding to this PUSCH-pathloss RS field does not need to be updated or activated.

The network device can configure multiple PUSCH-pathloss RSs for the terminal device, and multiple PUSCH-pathloss RS fields are set corresponding to the multiple PUSCH-pathloss RSs one by one. Some or all of the multiple PUSCH-pathloss RS fields may belong to the at least one PUSCH-pathloss RS field, then in the MAC CE, at least one SRI-PUSCH-Power Control field is set corresponding to the at least one PUSCH-pathloss RS field one by one, where an SRI-PUSCH-Power Control field in the at least one SRI-PUSCH-Power Control field is used to indicate an ID of an SRI-PUSCH-Power Control configuration in the at least one SRI-PUSCH-Power Control configuration.

It should be understood that since the SRI-PUSCH-Power Control field is used to indicate the ID of the SRI-PUSCH-Power Control configuration, the size of each SRI-PUSCH-Power Control field is then related to the number of SRI-PUSCH-Power Control configurations. In an embodiment, the method 200 may further include: the terminal device determines the size of each SRI-PUSCH-Power Control field in the at least one SRI-PUSCH-Power Control field according to the number of the at least one SRI-PUSCH-Power Control configuration. For example, as shown in FIG. 10 and FIG. 11, it is assumed that the maximum number of the at least one SRI-PUSCH-Power Control configuration is 16, then each SRI-PUSCH-Power Control field occupies 4 bits.

In addition, each PUSCH-pathloss RS field in the multiple PUSCH-pathloss RS fields is used to indicate whether the PUSCH-pathloss RS of the corresponding SRI-PUSCH-Power Control configuration needs to be updated or activated. Therefore, each PUSCH-pathloss RS field can only be set to occupy 1 bit. For example, if a certain PUSCH-pathloss RS field is "1", it means that the PUSCH-pathloss RS field is the first value, then the MAC CE is set with an SRI-PUSCH-Power Control field corresponding to the PUSCH-pathloss RS field. The SRI-PUSCH-Power Control field includes an ID of an SRI-PUSCH-Power Control configuration. A PUSCH-pathloss RS of the SRI-PUSCH-Power Control configuration indicated by this ID needs to be updated or activated; on the contrary, if a certain PUSCH-pathloss RS field is "0", it means that the PUSCH-pathloss RS field is not the first value, that is, a PUSCH-pathloss RS of an SRI-PUSCH-Power Control configuration corresponding to this PUSCH-pathloss RS field does not need to be updated or activated. In an embodiment, each PUSCH-pathloss RS field in the multiple PUSCH-pathloss RS fields may also be set to occupy multiple bits, and the embodiments of the present application are not limited thereto.

It should be understood that, similar to the MAC CE in the second embodiment, in the third embodiment, the multiple PUSCH-pathloss RS fields in the MAC CE may be contiguous or non-contiguous. Specifically, an example is taken here where the multiple SRI-PUSCH-Power Control fields are contiguous, that is, the MAC CE may include a PUSCH-pathloss RS bitmap, and the multiple PUSCH-pathloss RS fields are consecutive multiple bits included in the PUSCH-pathloss RS bitmap.

For example, as shown in FIG. 10, it is assumed that the terminal device has at most 16 PUSCH-pathloss RSs, and these 16 PUSCH-pathloss RSs correspond to 16 SRI-PUSCH-Power Control configurations one by one, then correspondingly, the PUSCH-pathloss RS bitmap included in the MAC CE can be set to 16 bits, that is, S0 to S15 in Oct2 and Oct3 as shown in FIG. 10. Each bit represents a PUSCH-pathloss RS field correspondingly. The MAC CE includes a total of 16 PUSCH-pathloss RS fields. Or, as shown in FIG. 11, it is assumed that the terminal device has at most 8 PUSCH-pathloss RSs, and the 8 PUSCH-pathloss RSs correspond to 8 SRI-PUSCH-Power Control configurations one by one, then correspondingly, the bitmap of the PUSCH-pathloss RSs included in the MAC CE can be set to 8 bits, that is, S0 to S7 in Oct2 as shown in FIG. 11. Each bit represents a PUSCH-pathloss RS field correspondingly. The MAC CE includes a total of 8 PUSCH-pathloss RS fields.

In an embodiment, the arrangement of these 16 PUSCH-pathloss RS fields may be as shown in FIG. 10, and the arrangement of these 8 PUSCH-pathloss RS fields may be as shown in FIG. 11, or other arrangements may also be used, and the embodiments of the present application are not limited thereto.

As shown in FIG. 10 or FIG. 11, for at least one PUSCH-pathloss RS field whose bit value is "1" in a bitmap formed by these 16 or 8 PUSCH-pathloss RS fields, at least one SRI-PUSCH-Power Control field is correspondingly set thereafter one by one, each SRI-PUSCH-Power Control field includes an ID of an SRI-PUSCH-Power Control configuration, which indicates that the terminal device updates or activates a PUSCH-pathloss RS corresponding to the SRI-PUSCH-Power Control configuration. For example, it is assumed that a value of $S_3$ is "1", then an SRI-PUSCH-Power Control field is set corresponding to the $S_3$. The SRI-PUSCH-Power Control field includes an ID of an SRI-PUSCH-Power Control configuration. The ID of the PUSCH-pathloss RS of the SRI-PUSCH-Power Control configuration updated or activated by the terminal device is the ID of the PUSCH-pathloss RS corresponding to the $S_3$.

On the Contrary, for other PUSCH-pathloss RS fields whose bit values are "0" in the bitmap formed by the 16 or 8 PUSCH-pathloss RS fields, the SRI-PUSCH-Power Control field may not be set, or, the SRI-PUSCH-Power Control field may also be set, but the terminal device does not need to activate or update an ID of a PUSCH-pathloss RS of an SRI-PUSCH-Power Control configuration indicated by this SRI-PUSCH-Power Control field.

It should be understood that in this case where the PUSCH-pathloss RS bitmap is set, if a PUSCH-pathloss RS of a certain SRI-PUSCH-Power Control configuration does not need to be activated or updated by the terminal device, then the SRI-PUSCH-Power Control field is not set, that is, when a value of a bit in the PUSCH-pathloss RS bitmap is not a first value, an SRI-PUSCH-Power Control field corresponding thereto is not set, then the size of the MAC CE depends on the number of PUSCH-pathloss RSs, of the SRI-PUSCH-Power Control configurations, that need to be updated or activated by the terminal device.

It should be understood that multiple PUSCH-pathloss RS fields in the MAC CE may also be non-contiguous. Specifically, reference may be made to the second case in the second embodiment for the setting, which is not described herein again for brevity.

In an embodiment, as a fourth embodiment, an example is taken where the MAC CE includes at least one SRI-PUSCH-Power Control field and at least one PUSCH-pathloss RS field, however, different from the foregoing three embodiments, the at least one SRI-PUSCH-Power Control field included in this MAC CE corresponds to the at least one PUSCH-pathloss RS field one by one, where each PUSCH-pathloss RS field is a PUSCH-pathloss RS bitmap. Specifically, it is assumed that a first PUSCH-pathloss RS field is any one of the multiple PUSCH-pathloss RS fields, a first SRI-PUSCH-Power Control field is any one of the multiple SRI-PUSCH-Power Control fields, and the first SRI-PUSCH-Power Control field corresponds to the first PUSCH-pathloss RS field. The first SRI-PUSCH-Power Control field is used to indicate an ID of the first SRI-PUSCH-Power Control configuration in the at least one SRI-PUSCH-Power Control configuration, and the first PUSCH-pathloss RS field is a bitmap, which is referred to as a first PUSCH-pathloss RS bitmap here. Multiple bits included in the first PUSCH-pathloss RS bitmap correspond to multiple PUSCH-pathloss RSs configured for the terminal device one by one. One or more first bits in the first PUSCH-pathloss RS bitmap satisfy: a value of the first bit is a first value, and a PUSCH-pathloss RS corresponding to the first bit is a PUSCH-pathloss RS corresponding to the first SRI-PUSCH-Power Control configuration.

It should be understood that since the SRI-PUSCH-Power Control field is used to indicate the ID of the SRI-PUSCH-Power Control configuration, the size of each SRI-PUSCH-Power Control field is related to the number of SRI-PUSCH-Power Control configurations. In an embodiment, the method 200 may further include: the terminal device determines the size of each SRI-PUSCH-Power Control field in the at least one SRI-PUSCH-Power Control field according to the number of the at least one SRI-PUSCH-Power Control configuration. For example, as shown in FIG. 12, it is assumed that the maximum number of the at least one SRI-PUSCH-Power Control configuration is 16, each SRI-PUSCH-Power Control field occupies 4 bits.

It should be understood that the total number of bits in each bitmap of the at least one PUSCH-pathloss RS bitmap included in the MAC CE is determined by the number of PUSCH-pathloss RSs possessed by the terminal device. For example, as shown in FIG. 12, if the maximum number of PUSCH-pathloss RSs is 8, each PUSCH-pathloss RS bitmap has 8 bits; for another example, if the maximum number of PUSCH-pathloss RSs is 16, then each PUSCH-pathloss RS bitmap has 16 bits, and so on.

For example, as shown in FIG. 12, the MAC CE includes at least one SRI PUSCH-Power Control field, and each SRI-PUSCH-Power Control field includes an ID of an SRI-PUSCH-Power Control configuration, so as to indicate that the terminal device needs to activate or update a PUSCH-pathloss RS corresponding to the at least one SRI-PUSCH-Power Control configuration. For any SRI-PUSCH-Power Control field in the at least one SRI-PUSCH-Power Control field, for example, taking the SRI-PUSCH-Power Control field in Oct2 as an example, which is referred to as a first SRI-PUSCH-Power Control field here, the first SRI-PUSCH-Power Control field includes an ID of a first SRI-PUSCH-Power Control configuration. A field corresponding to the first SRI-PUSCH-Power Control field is the first PUSCH-pathloss RS field. The first PUSCH-pathloss RS field is a bitmap, which is referred to as the first PUSCH-pathloss RS bitmap here, and it is assumed that the terminal device has 8 PUSCH-pathloss RSs, that is, as shown in Oct3 in FIG. 12, the first PUSCH-pathloss RS bitmap has 8 bits, each bit represents a PUSCH-pathloss RS correspondingly.

It is assumed that only the value of $S_5$ in the first PUSCH-pathloss RS bitmap corresponding to the first SRI-PUSCH-Power Control field is "1", that is, the first value is "1", and other bits in the first PUSCH-pathloss RS bitmap are all "0", then it means that a PUSCH-pathloss RS corresponding to the first PUSCH-pathloss RS configuration indicated by the first SRI-PUSCH-Power Control field is $S_5$, and the ID of the PUSCH-pathloss RS corresponding to the SRI-PUSCH-Power Control configuration activated or updated by the terminal device is the ID of the PUSCH-pathloss RS corresponding to the $S_5$.

In an embodiment, the arrangement of the at least one SRI-PUSCH-Power Control field and the corresponding PUSCH-pathloss RS field included in the MAC CE may be as shown in FIG. 12, or may also be set in other manners, the embodiments of the present application are not limited thereto.

In the above four embodiments, the MAC CE includes two types of fields (the SRI-PUSCH-Power Control field and the PUSCH-pathloss RS field). However, the MAC CE may only include one type of the SRI-PUSCH-Power Control field and the PUSCH-pathloss field.

In an embodiment, as a fifth embodiment, the MAC CE may include a PUSCH-pathloss RS field, but does not include an SRI-PUSCH-Power Control field. Specifically, the MAC CE may include multiple PUSCH-pathloss RS fields, and the multiple PUSCH-pathloss RS fields correspond to multiple SRI-PUSCH-Power Control configurations and PUSCH-pathloss RSs configured for the terminal device one by one. Generally, one SRI-PUSCH-Power Control configuration corresponds to only one PUSCH-pathloss RS, therefore, the multiple PUSCH-pathloss RS fields corresponding to the multiple SRI-PUSCH-Power Control configurations can be arranged according to a specific order of the multiple SRI-PUSCH-Power Control configurations configured for terminal device, then a PUSCH-pathloss RS field in the multiple PUSCH-pathloss RS fields is used to indicate an ID of a PUSCH-pathloss RS of a corresponding SRI-PUSCH-Power Control configuration; in addition, the method 200 may further include: the terminal device determines, according to the ID of the PUSCH-pathloss RS indicated by each PUSCH-pathloss RS field in the multiple PUSCH-pathloss RS fields, whether to update or activate the PUSCH-pathloss RS of the SRI-PUSCH Power Control configuration corresponding to each PUSCH-pathloss RS field.

In an embodiment, considering that there may be multiple SRI-PUSCH-Power Control configurations corresponding to the same PUSCH-pathloss RS, hence, it is possible that IDs of PUSCH-pathloss RSs included in the multiple PUSCH-pathloss RS fields are the same, that is, the multiple SRI-PUSCH-Power Control configurations corresponding to the multiple PUSCH-pathloss RS fields correspond to the same PUSCH-pathloss RS.

It should be understood that since each PUSCH-pathloss RS field includes an ID of a PUSCH-pathloss RS, the size of each PUSCH-pathloss RS field is thus related to the number of PUSCH-pathloss RSs. In an embodiment, the method 200 may further include: the terminal device determines the size of each PUSCH-pathloss RS field in the at least one PUSCH-pathloss RS field according to the number of the at least one PUSCH-pathloss RS field. For example, it is assumed that the maximum number of the at least one PUSCH-pathloss RS is 8, then each PUSCH-pathloss RS field occupies 3 bits; for another example, as shown in FIG. 13, it is assumed that the maximum number of the at least one PUSCH-pathloss RS is 16, then each PUSCH pathloss RS field occupies 4 bits, and so on.

Specifically, taking FIG. 13 as an example, multiple PUSCH-pathloss RS fields are correspondingly set according to multiple SRI-PUSCH-Power Control configurations possessed by the terminal device, and each PUSCH-pathloss RS field corresponds to an SRI-PUSCH-Power Control configuration, and each PUSCH-pathloss RS field includes an ID of a PUSCH-pathloss RS of its corresponding SRI-PUSCH-Power Control configuration, then the terminal device can determine, according to the ID of the PUSCH-pathloss RS included in each PUSCH-pathloss RS field, whether a PUSCH-pathloss RS corresponding to each SRI-PUSCH-Power Control configuration needs to be updated or activated. For example, it is assumed that an ID of a PUSCH-pathloss RS included in the PUSCH-pathloss RS field corresponding to a certain SRI-PUSCH-Power Control configuration changes, it means that the terminal device needs to activate the PUSCH-pathloss RS of the SRI-PUSCH-Power Control configuration corresponding to the PUSCH-pathloss RS field.

In an embodiment, as a sixth embodiment, the MAC CE may further include an SRI-PUSCH-Power Control field, but does not include a PUSCH-pathloss RS field. Specifically, it is assumed here that, among multiple SRI-PUSCH-Power Control configurations configured by the network device for the terminal device, the situation where different SRI-PUSCH-Power Control configurations correspond to the same PUSCH-pathloss RS does not exist. For example, the multiple SRI-PUSCH-Power Control configurations configured for the terminal device correspond to multiple PUSCH-pathloss RSs one by one, then the MAC CE may include multiple SRI-PUSCH-Power Control fields, and the multiple SRI-PUSCH-Power Control fields correspond to the multiple SRI-PUSCH-Power Control configurations and PUSCH-pathloss RSs configured fir the terminal device one by one.

Since one PUSCH-pathloss RS corresponds to only one SRI-PUSCH-Power Control configuration, therefore, multiple SRI-PUSCH-Power Control fields corresponding to the multiple PUSCH-pathloss RS fields can be arranged according to a specific order of the multiple PUSCH-pathloss RSs configured for the terminal device, then an SRI-PUSCH-Power Control field in the multiple SRI-PUSCH-Power Control fields is used to indicate an ID of a corresponding SRI-PUSCH-Power Control configuration; in addition, the method 200 may further include: the terminal device determines, according to the ID of the SRI-PUSCH-Power Control configuration indicated by each SRI-PUSCH-Power Control field in the multiple SRI-PUSCH-Power Control fields, whether to update or activate a PUSCH-pathloss RS of the SRI-PUSCH-Power Control configuration corresponding to the each SRI-PUSCH-Power Control field.

In an embodiment, it is assumed that there may be multiple PUSCH-pathloss RSs corresponding to the same SRI-PUSCH-Power Control configuration, then IDs of SRI-PUSCH-Power Control configurations included in the multiple SRI-PUSCH-Power Control fields may be the same, that is, the multiple PUSCH-pathloss RSs corresponding to the multiple SRI-PUSCH-Power Control fields correspond to the same SRI-PUSCH-Power Control configuration.

It should be understood that since the SRI-PUSCH-Power Control field is used to indicate the ID of the SRI-PUSCH-Power Control configuration, therefore, the size of each SRI-PUSCH-Power Control field is related to the number of SRI-PUSCH-Power Control configurations, in an embodiment, the method 200 may further include: the terminal device determines the size of each SRI-PUSCH-Power Control field in the at least one SRI-PUSCH-Power Control field according to the number of the at least one SRI-PUSCH-Power Control COD figuration. For example, as shown in FIG. 14, it is assumed that the maximum number of the at least one SRI-PUSCH-Power Control configuration is 16, then each SRI-PUSCH-Power Control field occupies 4 bits.

Specifically, taking FIG. 14 as an example, multiple SRI-PUSCH-Power Control fields are set according to multiple PUSCH-pathloss RSs possessed by the terminal device, and each SRI-PUSCH-Power Control field corresponds to a PUSCH-pathloss RS, and each SRI-PUSCH-Power Control field includes an ID of its corresponding SRI-PUSCH-Power Control configuration, then the terminal device can determines, according to an ID of an SRI-PUSCH-Power Control configuration included in each SRI-PUSCH-Power Control field and a PUSCH-pathloss RS corresponding to each SRI-PUSCH-Power Control field, whether a PUSCH-pathloss RS corresponding to each SRI-PUSCH-Power Control configuration needs to be updated or activated. For example, it is assumed that an ID of an SRI-PUSCH-Power Control configuration included in an SRI-PUSCH-Power Control field corresponding to a certain PUSCH-pathloss RS changes, it means that the terminal device needs to activate a PUSCH-pathloss RS of the SRI-PUSCH Power Control configuration corresponding to the SRI-PUSCH-Power Control field.

Therefore, in the method for activating or updating the pathloss reference signal corresponding to the PUSCH in the embodiments of the present application, a variety of different MAC CE formats can be set flexibly, and a PUSCH-pathloss RS ID corresponding to an SRI-PUSCH-Power Control configuration can be activated or updated based on this MAC CE, thereby reducing the transmission delay significantly.

It should be understood that in various embodiments of the present application, the magnitudes of the sequence numbers of the above-mentioned processes do not mean the execution orders. The execution orders of the processes should be determined by their functions and internal logic, and should not constitute any limitation to the implementation process of the embodiments of the present application.

The method for activating or updating the pathloss reference signal corresponding to the sounding reference signal according to the embodiments of the present application is described, in detail above with reference to FIG. 1 to FIG. 14. A terminal device and a network device will be described below with reference to FIG. 15 to FIG. 19 according to the embodiments of the present application.

As shown in FIG. 15, a terminal device 300 according to an embodiment of the present application includes: a processing unit 310 and a transceiving unit 320. Specifically, the transceiving unit 320 is configured to receive a MAC CE transmitted by a network device, where the MAC CE includes at least one SRI-PUSCH-Power Control field and/or at least one pathless RS field, and the at least one SRI-PUSCH-Power Control field is used to indicate at least one SRI-PUSCH-Power Control configuration, and the at least one pathless RS field is used to indicate at least one pathless RS corresponding to the at least one SRI-PUSCH-Power Control configuration; and the processing unit 310 is configured to update or activate the at least one pathloss RS corresponding to the at least one SRI-PUSCH-Power Control configuration according to the MAC CE.

In an embodiment, as an embodiment, the MAC CE includes the at least one SRI-PUSCH-Power Control field and the at least one pathloss RS field.

In an embodiment, as an embodiment, the at least one SRI-PUSCH-Power Control field corresponds to the at least one pathloss RS field one by one, and an SRI-PUSCH-Power Control field in the at least one SRI-PUSCH-Power Control field is used to indicate an identifier of an SRI-PUSCH-Power Control configuration in the at least one SRI-PUSCH-Power Control configuration, and a pathloss RS field in the at least one pathless RS field is used to indicate an identifier of a pathloss RS in the at least one the pathless RS.

In an embodiment, as an embodiment, the MAC CE includes multiple SRI-PUSCH-Power Control fields, and the multiple SRI-PUSCH-Power Control fields correspond to multiple SRI-PUSCH-Power Control configurations configured for the terminal device 300 one by one, each SRI-PUSCH-Power Control field in the multiple SRI-PUSCH-Power Control fields is used to indicate whether a pathless RS of a corresponding SRI-PUSCH-Power Control configuration needs to be updated or activated, an SRI-PUSCH-Power Control field represented as a first value in the multiple SRI-PUSCH-Power Control fields is the at least one SRI-PUSCH-Power Control field, and the at least one SRI-PUSCH-Power Control field corresponds to the at least one pathless RS field one by one, a pathless RS field in the at least one pathless RS field is used to indicate an identifier of a pathloss RS in the at least one pathloss RS.

In an embodiment, as an embodiment, the MAC CE includes an SRI PUSCH-Power Control bitmap, and the multiple SRI-PUSCH-Power Control fields are consecutive multiple bits included in the SRI-PUSCH-Power Control bitmap.

In an embodiment, as an embodiment, the MAC CE includes multiple pathless RS fields, the multiple pathless RS fields correspond to the multiple SRI-PUSCH-Power Control fields one by one, and the at least one pathloss RS field in the multiple pathless RS fields corresponds to the at least one SRI-PUSCH-Power Control field one by one, and a first pathloss RS field in the multiple pathless RS fields corresponds to a first SRI-PUSCH-Power Control field in the multiple SRI-PUSCH Power Control fields, the first pathless RS field and the first SRI-PUSCH-Power Control field are contiguous, the first pathless RS field is used to indicate an identifier of a first pathless RS, and the first pathloss RS corresponds to a first SRI-PUSCH-Power Control configuration corresponding to the first SRI-PUSCH-Power Control field.

In an embodiment, as an embodiment, if multiple pathless RSs configured for the terminal device 300 correspond to multiple SRI-PUSCH-Power Control configurations one by one, the MAC CE includes a pathloss RS bitmap, multiple bits included in the RS pathloss bitmap correspond to the multiple pathless RSs one by one, and each bit in the pathless RS bitmap is used to indicate whether a corresponding pathless RS needs to be updated or activated, a pathloss RS field represented as a first value in the multiple pathless RS fields is the at least one pathloss RS field, the at least one pathless RS field corresponds to the at least one SRI-PUSCH-Power Control field one by one, and an SRI-PUSCH-Power Control field in the at least one SRI-PUSCH-Power Control field is used to indicate an identifier of an SRI-PUSCH-Power Control configuration in the at least one SRI-PUSCH-Power Control configuration.

In an embodiment, as an embodiment, the at least one SRI-PUSCH-Power Control field corresponds to the at least one pathloss RS field one by one, a first SRI-PUSCH-Power Control field in the at least one SRI-PUSCH-Power Control field is used to indicate an identifier of a first SRI-PUSCH-Power Control configuration in the at least one SRI-PUSCH-Power Control configuration, and the first SRI-PUSCH-Power Control field corresponds to a first pathloss RS field in the at least one pathloss RS field, the first pathloss RS field is a first pathloss RS bitmap, and multiple bits included in the first pathloss RS bitmap correspond to multiple pathloss RSs configured for the terminal device 300, a value stored in a first bit in the first pathloss RS bitmap is a first value, and a pathloss RS corresponding to the first bit is a pathloss RS corresponding to the first SRI-PUSCH-Power Control configuration.

In an embodiment, as an embodiment, the MAC CE includes multiple pathloss RS fields, and the multiple pathloss RS fields correspond to multiple SRI-PUSCH-Power Control configurations configured for the terminal device 300 one by one, a pathloss RS field in the multiple pathloss RS fields is used to indicate an identifier of a pathloss RS of a corresponding SRI-PUSCH-Power Control configuration the processing unit 310 is further configured to: determine, according to an identifier of a pathloss RS indicated by each pathloss RS field in the multiple pathloss RS fields, whether to update or activate a pathloss RS of an SRI-PUSCH-Power Control configuration corresponding to each pathloss RS field.

In an embodiment, as an embodiment, the processing unit 310 is further configured to: determine a size of each SRI-PUSCH-Power Control field in the at least one SRI-PUSCH-Power Control field according to a number of the to least one SRI-PUSCH-Power Control configuration.

In an embodiment, as an embodiment, if a maximum number of the at least one SRI-PUSCH-Power Control configuration is 16, each SRI-PUSCH-Power Control field occupies 4 bits.

In an embodiment, as an embodiment, the processing unit 310 is further configured to determine a size of each pathloss RS field in the at least one pathloss RS field according to a number of the at least one pathloss RS field.

In an embodiment, as an embodiment, if a maximum number of the at least one pathloss RS is 4, each pathloss RS field occupies 2 bits; if a maximum number of the at least one pathloss RS is 8, each pathloss RS field occupies 3 bits; or, if a maximum number of the at least one pathloss RS is 16, each pathloss RS field occupies 4 bits.

In an embodiment, as an embodiment, the MAC CE further includes a serving cell identifier field, and the serving cell identifier field is used to indicate an identifier of a serving cell where the terminal device 300 resides.

In an embodiment, as an embodiment, the MAC CE further includes a bandwidth part identifier field, and the bandwidth part identifier field is used to indicate an identifier of a bandwidth part corresponding to the terminal device 300.

In an embodiment, as an embodiment, a header of a MAC PM where the MAC CE is located includes a logical channel identifier field, and the logical channel identifier field is used to indicate a type of the MAC CE.

It should be understood that the above and other operations and/or functions of the various units in the terminal device 300 of the embodiments of the present application are respectively used to implement the corresponding procedures of the terminal device in each method in FIG. 1 to FIG. 14, which will not be repeated herein for brevity.

Therefore, the terminal device of the embodiments of the present application can flexibly set a variety of different MAC CE formats, and activate or update a PUSCH-pathloss RS ID corresponding to an SRI-PUSCH-Power Control configuration based on the MAC CE, so that the transmission delay is greatly reduced.

Figure 16:
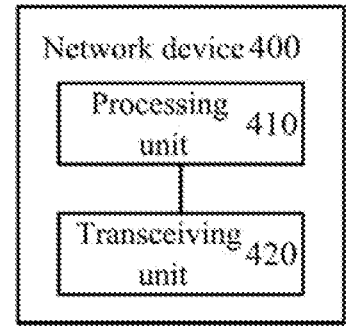
FIG. 16 is a schematic block diagram of a network device according to an embodiment of the present application.

As shown in FIG. 16, a network device 400 according to an embodiment of the present application includes: a processing unit 410 and a transceiving unit 420, Specifically, the transceiving unit 420 is configured to transmit a MAC CE to a terminal device, where the MAC CE includes at least one SRI-PUSCH-Power Control field and/or at least one pathloss RS field, and the at least one SRI-PUSCH-Power Control field is used to indicate at least one SRI-PUSCH-Power Control configuration, the at least one pathloss RS field is used to indicate at least one pathloss RS corresponding to the at least one SRI-PUSCH-Power Control configuration, the MAC CE is used to indicate updating or activation of the at least one pathloss RS corresponding to the at least one SRI-PUSCH-Power Control configuration by the terminal device.

In an embodiment, as an embodiment, the MAC CE includes the at least one SRI-PUSCH-Power Control field and the at least one pathloss RS field.

In an embodiment, as an embodiment, the at least one SRI-PUSCH-Power Control field corresponds to the at least one pathloss RS field one by one, an SRI-PUSCH-Power Control field in the at least one SRI-PUSCH-Power Control field is used to indicate an identifier of an SRI-PUSCH-Power Control configuration in the at least one SRI-PUSCH-Power Control configuration, and a pathloss RS field in the at least one pathloss RS field is used to indicate an identifier of a pathloss RS in the at least one pathloss RS.

In an embodiment, as an embodiment, the MAC CE includes multiple SRI-PUSCH-Power Control fields, and the multiple SRI-PUSCH-Power Control fields correspond to multiple SRI-PUSCH-Power Control configurations configured by the network device 400 for the terminal device one by one, and each SRI-PUSCH-Power Control field in the multiple SRI-PUSCH-Power Control fields is used to indicate whether a pathloss RS of a corresponding SRI-PUSCH-Power Control configuration needs to be updated or activated, an SRI-PUSCH-Power Control field represented as a first value in the multiple SRI-PUSCH-Power Control fields is the at least one SRI-PUSCH-Power Control field, the at least one SRI-PUSCH-Power Control field corresponds to the at least one pathloss RS fields one by one, and a pathloss RS field in the at least one pathloss RS field is used to indicate an identifier of a pathloss RS in the at least one pathloss RS.

In an embodiment, as an embodiment, the MAC CE includes an SRI-PUSCH-Power Control bitmap, and the multiple SRI-PUSCH-Power Control fields are consecutive multiple bits included in the SRI-PUSCH-Power Control bitmap.

In an embodiment, as an embodiment, the MAC CE includes multiple pathless RS fields, the multiple pathloss RS fields correspond to the multiple SRI-PUSCH-Power Control fields one by one, and the at least one pathloss RS field in the multiple pathless RS fields corresponds to the at least one SRI-PUSCH-Power Control field one by one, and a first pathless RS field in the multiple pathloss RS fields corresponds to a first SRI-PUSCH-Power Control field in the multiple SRI-PUSCH power control fields, the first pathloss RS field and the first SRI-PUSCH-Power Control field are continuous, and the first pathloss RS field is used to indicate an identifier of a first pathloss RS, and the first pathloss RS corresponds to a first SRI-PUSCH-Power Control configuration corresponding to the first SRI-PUSCH-Power Control field.

In an embodiment, as an embodiment, if multiple pathloss RSs configured for the terminal device correspond to multiple SRI-PUSCH-Power Control configurations one by one, the MAC CE includes a pathloss RS bitmap, and multiple bits included in the pathloss RS bitmap correspond to the multiple pathloss RSs one by one, each bit in the pathloss RS bitmap is used to indicate whether a corresponding pathloss RS needs to be updated or activated, a pathloss RS field represented as a first value in the multiple pathless RS fields is the at least one pathloss RS field, the at least one pathloss RS field corresponds to the at least one SRI-PUSCH-Power Control field one by one, and an SRI-PUSCH-Power Control field in the at least one SRI-PUSCH-Power Control field is used to indicate an identifier of an SRI-PUSCH-Power Control configuration in the PUSCH power control configuration.

In an embodiment, as an embodiment, the al least one SRI-PUSCH-Power Control field corresponds to the at least one pathloss RS field one by one, and a first SRI-PUSCH-Power Control field in the at least one SRI-PUSCH-Power Control field is used to indicate an identifier of a first SRI-PUSCH-Power Control configuration in the at least one SRI-PUSCH-Power Control configuration, and the first SRI-PUSCH-Power Control field corresponds to a first pathloss RS field in the at least one pathloss RS field, the first pathloss RS field is a first pathloss RS bitmap, and multiple bits included in the first pathloss RS bitmap correspond to multiple pathloss RSs configured by the network device 400 for the terminal device one by one, a value stored in a first bit in the first pathloss RS bitmap is a first value, and a pathloss RS corresponding to the first bit is a pathloss RS corresponding to the first SRI-PUSCH-Power Control configuration.

In an embodiment, as an embodiment, the MAC CE includes multiple pathloss RS fields, and the multiple pathloss RS fields correspond to multiple SRI-PUSCH-Power control configurations configured by the network device 400 for the terminal device one by one, a first pathloss RS field in the multiple pathloss RS fields is used to indicate an identifier of a first pathloss RS corresponding to a first SRI-PUSCH-Power Control configuration; the identifier of the first pathloss RS is used to indicate whether to update or activate the first pathloss RS of the first SRI-PUSCH-Power Control configuration corresponding to the first pathloss RS field by the terminal device.

In an embodiment, as an embodiment, the processing unit 410 is configured to determine a size of each SRI-PUSCH-Power Control field in the at least one SRI-PUSCH-Power Control field according to a number of the at least one SRI-PUSCH-Power Control configuration.

In an embodiment, as an embodiment, if a maximum number of the at least one SRI-PUSCH-Power Control configuration is 16, each SRI-PUSCH-Power Control field occupies 4 bits.

In an embodiment, as an embodiment, the processing unit 410 is configured to determine a size of each pathloss RS field in the at least one pathloss RS field according to a number of the at least one pathloss RS field.

In an embodiment, as an embodiment, if a maximum number of the at least one pathloss RS is 4, each pathloss RS field occupies 2 bits; if a maximum number of the at least one pathloss RS is 8, each pathloss RS field occupies 3 bits; or, if a maximum number of the at least one pathless RS is 16, each pathless RS field occupies 4 bits.

In an embodiment, as an embodiment, the MAC CE further includes a serving cell identifier field, and the serving cell identifier field is used to indicate an identifier of a serving cell where the terminal device resides.

In an embodiment, as an embodiment, the MAC CE further includes a bandwidth part identifier field, and the bandwidth part identifier field is used to indicate an identifier of a bandwidth part corresponding to the terminal device.

In an embodiment, as an embodiment, a header of a MAC protocol data unit where the MAC CE is located comprises a logical channel identifier field, and the logical channel identifier field is used to indicate a type of the MAC CE.

It should be understood that the above-mentioned and other operations and/or functions of each unit in the network device 400 of the embodiments of the present application are respectively intended to implement the corresponding procedures of the network device in each method in FIG. 1 to FIG. 14, which will not be repeated herein for brevity.

Therefore, the network device of the embodiments of the present application can flexibly be set a variety of different MAC CE formats, and activate or update a PUSCH-pathloss RS ID corresponding to an SRI-PUSCH-Power Control configuration based on the MAC CE, so that the transmission delay is greatly reduced.

Figure 17:
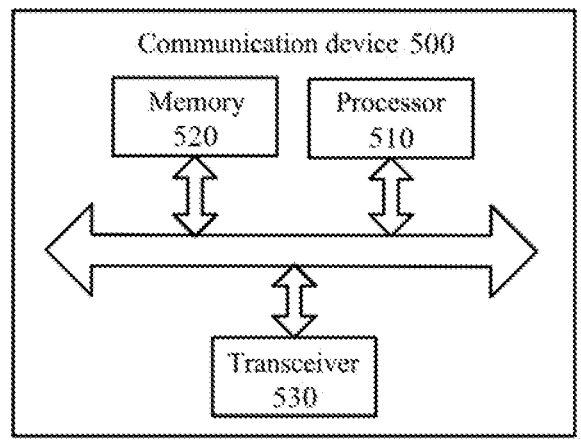
FIG. 17 is a schematic block diagram ail communication device according to an embodiment of the present application.

FIG. 17 is a schematic structural diagram of a communication device 500 provided by an embodiment of the present application. The communication device 500 shown in FIG. 17 includes a processor 510, and the processor 510 can call and run a computer program from a memory to implement the method in the embodiments of the present application.

In an embodiment, as shown in FIG. 17, the communication device 500 may further include a memory 520. The processor 510 may call and run a computer program from the memory 520 to implement the method in the embodiments of the present application.

Where the memory 520 may be a separate device independent of the processor 510, or may be integrated in the processor 510.

In an embodiment as shown in FIG. 7, the communication device 500 may further include a transceiver 530, and the processor 510 may control the transceiver 530 to communicate with other devices. Specifically, it may transmit information or data to other devices, or receive information or data transmitted by other devices.

Where the transceiver 530 may include a transmitter and a receiver. The transceiver 530 may further include an antenna, and the number of antennas may be one or more.

In an embodiment, the communication device 500 may specifically be a network device in the embodiments of the present application, and the communication device 500 may implement a corresponding process implemented by the network device in each method of the embodiments of the present application, which is not repeated herein for brevity.

In an embodiment, the communication device 500 may specifically be a mobile terminal/terminal device of the embodiments of the present application, and the communication device 500 may implement a corresponding process implemented by the mobile terminal/terminal device in each method of the embodiment of the present application, which is not repeated herein for brevity.

Figure 18:
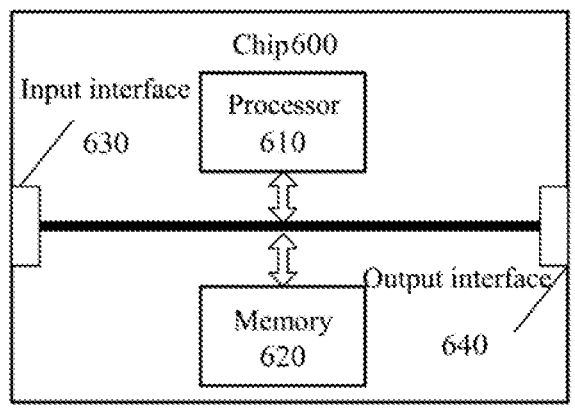
FIG. 18 is a schematic block diagram of a chip according to an embodiment of the present application.

FIG. 18 is a schematic structural diagram of a chip of an embodiment of the present application. The chip 600 shown in FIG. 18 includes a processor 610, and the processor 610 can call and run a computer program from a memory to implement the method in the embodiments of the present application.

In an embodiment, as shown in FIG. 18, the chip 600 may further include a memory 620. The processor 610 may call and run a computer program from the memory 620 to implement the method in the embodiments of the present application.

The memory 620 may be a separate device independent of the processor 610, or may be integrated in the processor 610.

In an embodiment, the chip 600 may further include an input interface 630, Where the processor 610 can control the input interface 630 to communicate with other devices or chips, and specifically, can obtain information or data transmitted by other devices or chips.

In an embodiment, the chip 600 may further include an output interface 640. The processor 610 can control the output interface 640 to communicate with other devices or chips, and specifically, can output information or data to other devices or chips.

In an embodiment, the chip can be applied to a network device in the embodiments of the present application, and the chip can implement a corresponding process implemented by the network device in each method of the embodiments of the present application, which is not repeated herein for brevity.

In an embodiment, the chip can be applied to a mobile terminal/terminal device in the embodiments of the present application, and the chip can implement the corresponding process implemented by the mobile terminal/terminal device in each method of the embodiments of the present application, which is not repeated herein for brevity.

It should be understood that the chip mentioned in the embodiments of the present application may also be referred to as a system-level chip, a system chip, a chip system, or a system-on-chip, etc.

Figure 19:
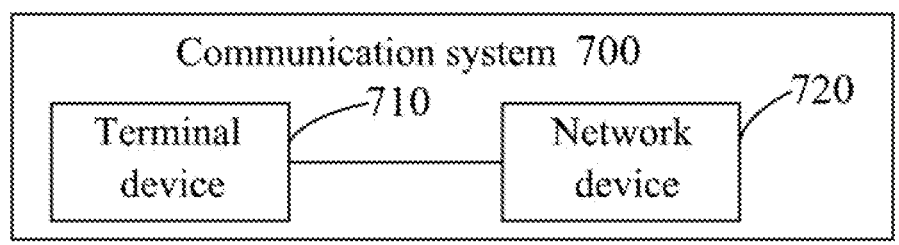
FIG. 19 is a schematic diagram of a communication system according to an embodiment of the present application.

FIG. 19 is a schematic block diagram of a communication system 700 according to an embodiment of the present application. As shown in FIG. 19, the communication system 700 includes a terminal device 710 and a network device 720.

Where the terminal device 710 can be configured to implement corresponding functions implemented by the terminal device in the above method, and the network device 720 can be configured to implement corresponding functions implemented by the network device in the above method, which is not repeated herein for brevity.

It should be understood that the processor of the embodiments of the present application may be an integrated circuit chip with signal processing capabilities. In the implementation process, the steps of the above method embodiments can be completed by hardware integrated logic circuits in the processor or instructions in the form of software. The above processor can be a general-purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present application can be implemented or executed. The general processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module can be located in a mature storage medium in the field, such as a random access memory, a flash memory, a read-only memory, a programmable read-only memory, or an electrically erasable programmable memory, a register or the like. The storage medium is located in the memory, and the processor reads information in the memory and completes the steps of the above method in combination with its hardware.

It can be understood that the memory in the embodiments of the present application may be a volatile memory or a non-volatile memory, or may include both volatile and non-volatile memory. Where the non-volatile memory can be a read-only memory (ROM), a programmable read-only memory (Programmable ROM, PROM), an erasable programmable read-only memory (Erasable PROM, EPROM), an electrically available Erase programmable read-only memory (Electrically EPROM, EEPROM) or a flash memory. The volatile memory may be a random access memory (RAM), which is used as an external cache. By way of exemplary but not restrictive description, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate SDRAM (DDR SDRAM), an enhanced synchronous dynamic random access memory (Enhanced SDRAM, ESDRAM), a synchronous link dynamic random access memory (synch link DRAM, SLDRAM) and a direct rambus RAM (DR RAM). It should be noted that the memory of the systems and methods described herein is intended to include, but is not limited to, these or any other suitable types of memories.

It should be understood that the above memory is exemplary but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous connection Dynamic random access memory (synch link DRAM, SLDRAM) and direct memory bus random access memory (Direct Rambus RAM, DR RAM), etc. In other words, the memory in the embodiments of the present application is intended to include, but is not limited to, these or any other suitable types of memories.

The embodiments of the present application also provide a computer-readable storage medium for storing a computer program.

In an embodiment, the computer-readable storage medium may be applied to the network device in the embodiments of the present application, and the computer program causes a computer to execute the corresponding process implemented by the network device in each method of the embodiments of the present application, which is not repeated herein for brevity.

In an embodiment, the computer-readable storage medium can be applied to the mobile terminal/terminal device in the embodiments of the present application, and the computer program causes a computer to execute the corresponding process implemented by the mobile terminal/terminal device in each method of the embodiments of the present application, which is not repeated herein for brevity.

The embodiments of the present application also provide a computer program product, including computer program instructions.

In an embodiment, the computer program product may be applied to the network device in the embodiments of the present application, and the computer program instructions cause a computer to execute the corresponding process implemented by the network device in each method of the embodiments of the present application, which is not repeated here for brevity.

In an embodiment, the computer program product can be applied to the mobile terminal/terminal device in the embodiments of the present application, and the computer program instructions cause a computer to execute the corresponding process implemented by the mobile terminal/terminal device in each method of the embodiments of the present application, which is not repeated here for brevity.

The embodiment of the present application also provides a computer program.

In an embodiment, the computer program can be applied to the network device in the embodiments of the present application. When the computer program is run on a computer, the computer is caused to execute the corresponding process implemented by the network device in each method of the embodiments of the present application, which is not repeated here for brevity.

In an embodiment, the computer program can be applied to the mobile terminal/terminal device in the embodiment of the present application. When the computer program runs on a computer, the computer executes each method in the embodiments of the present application, which is not repeated here for brevity.

Those ordinary skilled in the art may be aware that the units and algorithm steps of the examples described in combination with the embodiments disclosed herein can be implemented by electronic hardware or a con union of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present application.

Those skilled in the art can clearly understand that, for the convenience and conciseness of description, for specific working processes of the above-described system, device, and units, reference can be made to the corresponding processes in the foregoing method embodiments which is not repeated herein for brevity.

In several embodiments according to the present application, it should be understood that the disclosed system, device, and method may be implemented in other ways. For example, the device embodiments described above are only illustrative. For example, the division of the units is only a logical function division, and there may be other divisions in actual implementation, for example, multiple units or components may be combined or can be integrated into another system, or some features can be ignored or not executed. Another point, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into a processing unit, or each unit may exist alone physically, or two or more units may be integrated into a unit.

If the function is implemented in the form of a software functional unit and sold or used as an independent product, it can be stored in a computer-readable storage medium. Based on this understanding, the technical solution of the present application essentially or the part that contributes to the prior art or a pan of the technical solution can be embodied in the form of a software product, and the computer software product is stored in a storage medium, including several instructions used to cause a computer device (which may be a personal computer, a server, or a network device, etc.) to execute all or part of the steps of the methods described in the various embodiments of the present application. The foregoing storage medium includes: a U disk, a mobile hard disk, a read-only memory (ROM), a random access memory RAM), a magnetic disk or an optical disk and other mediums that can store program codes.

The above are only specific implementations of the present application, however, the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A method for activating or updating a pathloss reference signal (RS) corresponding to a physical uplink shared channel (PUSCH), comprising:
   receiving, by a terminal device, a medium access control (MAC) control element (CE) transmitted by a network device, wherein the MAC CE comprises at least one spatial relationship information (SRI)-PUSCH-Power Control field and at least one pathloss RS field, and the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; and
   updating or activating, by the terminal device, the at least one pathloss RS corresponding to the at least one SRI-PUSCH-Power Control configuration according to the MAC CE;
   wherein the MAC CE comprises multiple SRI-PUSCH-Power Control fields, and the multiple SRI-PUSCH-Power Control fields correspond to multiple SRI-PUSCH-Power Control configurations configured for the terminal device one by one, and each SRI-PUSCH-Power Control field in the multiple SRI-PUSCH-Power Control fields is used to indicate whether a pathloss RS of a corresponding SRI-PUSCH-Power Control configuration needs to be updated or activated,
   an SRI-PUSCH-Power Control field represented as a first value in the multiple SRI-PUSCH-Power Control fields is the at least one SRI-PUSCH-Power Control field,
   the at least one SRI-PUSCH-Power Control field corresponds to the at least one pathloss RS field one by one, and a pathloss RS field in the at least one pathloss RS field is used to indicate an identifier of a pathloss RS in the at least one pathloss RS.

2. The method according to claim 1, wherein if a maximum number of the at least one SRI-PUSCH-Power Control configuration is 16, each SRI-PUSCH-Power Control field occupies 4 bits.

3. The method according to claim 1, wherein the MAC CE further comprises at least one of the following:
   a serving cell identifier field, wherein the serving cell identifier field is used to indicate an identifier of a serving cell where the terminal device resides;
   a bandwidth part (BWP) identifier field, wherein the BWP identifier field is used to indicate an identifier of a BWP corresponding to the terminal device; and
   a reserved bit.

4. The method according to claim 3, wherein a maximum number of serving cells where the terminal device resides is 32, and correspondingly, the serving cell identification field occupies 5 bits; and
   a maximum number of BWPs corresponding to the terminal device is 4, and correspondingly, the BWP identifier field occupies 2 bits.

5. The method according to claim 1, wherein a header of a MAC protocol data unit where the MAC CE is located comprises a logical channel identifier field, and the logical channel identifier field is used to indicate a type of the MAC CE.

6. A terminal device, comprising:
   at least one processor,
   an input interface connected with the at least one processor; and
   a memory connected with the at least one processor;
   wherein the instructions, when executable by the at least one processor, cause the at least one processor to:
   control the input interface to receive a medium access control (MAC) control element (CE) transmitted by a network device, wherein the MAC CE comprises at least one spatial relationship information (SRI)-physical uplink shared channel (PUSCH) power control field and at least one pathloss reference signal (RS) field, and the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; and update or activate the at least one pathloss RS corresponding to the at least one SRI-PUSCH-Power Control configuration according to the MAC CE;

wherein the MAC CE comprises multiple SRI-PUSCH-Power Control fields, and the multiple SRI-PUSCH-Power Control fields correspond to multiple SRI-PUSCH-Power Control configurations configured for the terminal device one by one and each SRI-PUSCH-Power Control field in the multiple SRI-PUSCH-Power Control fields is used to indicate whether a pathloss RS of a corresponding SRI-PUSCH-Power Control configuration needs to be updated or activated, an SRI-PUSCH-Power Control field represented as a first value in the multiple SRI-PUSCH-Power Control fields is the at least one SRI-PUSCH-Power Control field, the at least one SRI-PUSCH-Power Control field corresponds to the at least one pathloss RS field one by one, and a pathloss RS field in the at least one pathloss RS field is used to indicate an identifier of a pathloss RS in the at least one pathloss RS.

7. The terminal device according to claim 6, wherein if a maximum number of the at least one SRI-PUSCH-Power Control configuration is 16, each SRI-PUSCH-Power Control field occupies 4 bits.

8. The terminal device according to claim 6, wherein the MAC CE further comprises at least one of followings:
a serving cell identifier field, wherein the serving cell identifier field is used to indicate an identifier of a serving cell where the terminal device resides;
a bandwidth part (BWP) identifier field, wherein the BWP identifier field is used to indicate an identifier of a BWP corresponding to the terminal device; and
a reserved bit.

9. The terminal device according to claim 8, wherein a maximum number of serving cells where the terminal device resides is 32, and correspondingly, the serving cell identification field occupies 5 bits; and
a maximum number of BWPs corresponding to the terminal device is 4, and correspondingly, the BWP identifier field occupies 2 bits.

10. The terminal device according to claim 6, wherein a header of a MAC protocol data unit where the MAC CE is located comprises a logical channel identifier field, and the logical channel identifier field is used to indicate a type of the MAC CE.

11. A network device, comprising:
at least one processor,
an output interface connected with the at least one processor; and
a memory connected with the at least one processor; wherein,
the instructions, when executable by the at least one processor, cause the at least one processor to:

control the output interface to transmit a medium access control (MAC) control element (CE) to a terminal device, wherein the MAC CE comprises at least one spatial relationship information (SRI)-physical uplink shared channel (PUSCH) power control field and at least one pathloss reference signal (RS) field, and the at least one SRI-PUSCH-Power Control field is used to indicate at least one SRI-PUSCH-Power Control configuration, and the at least one pathloss RS field is used to indicate at least one pathloss RS corresponding to the at least one SRI-PUSCH-Power Control configuration; the MAC CE is used to indicate updating or activation of the at least one pathloss RS corresponding to the at least one SRI-PUSCH-Power Control configuration by the terminal device;

wherein the MAC CE comprises multiple SRI-PUSCH-Power Control fields, and the multiple SRI-PUSCH-Power Control fields correspond to multiple SRI-PUSCH-Power Control configurations configured by the network device for the terminal device one by one, and each SRI-PUSCH-Power Control field in the multiple SRI-PUSCH-Power Control fields is used to indicate whether a pathloss RS of a corresponding SRI-PUSCH-Power Control configuration needs to be updated or activated, an SRI-PUSCH-Power Control field represented as a first value in the multiple SRI-PUSCH-Power Control fields is the at least one SRI-PUSCH-Power Control field, the at least one SRI-PUSCH-Power Control field corresponds to the at least one pathloss RS field one by one, and a pathloss RS field in the at least one pathloss RS field is used to indicate an identifier of a pathloss RS in the at least one pathloss RS.

12. The network device according to claim 11, wherein if a maximum number of the at least one SRI-PUSCH-Power Control configuration is 16, each SRI-PUSCH-Power Control field occupies 4 bits.

13. The network device according to claim 11, wherein the MAC CE further comprises at least one of followings:
a serving cell identifier field, wherein the serving cell identifier field is used to indicate an identifier of a serving cell where the terminal device resides;
a bandwidth part (BWP) identifier field, wherein the BWP identifier field is used to indicate an identifier of a BWP corresponding to the terminal device; and
a reserved bit.

14. The network device according to claim 13, wherein a maximum number of serving cells where the terminal device resides is 32, and correspondingly, the serving cell identification field occupies 5 bits; and
a maximum number of BWPs corresponding to the terminal device is 4, and correspondingly, the BWP identifier field occupies 2 bits.

15. The network device according to claim 11, wherein a header of a MAC protocol data unit where the MAC CE is located comprises a logical channel identifier field, and the logical channel identifier field is used to indicate a type of the MAC CE.

* * * * *